UNITED STATES PATENT OFFICE.

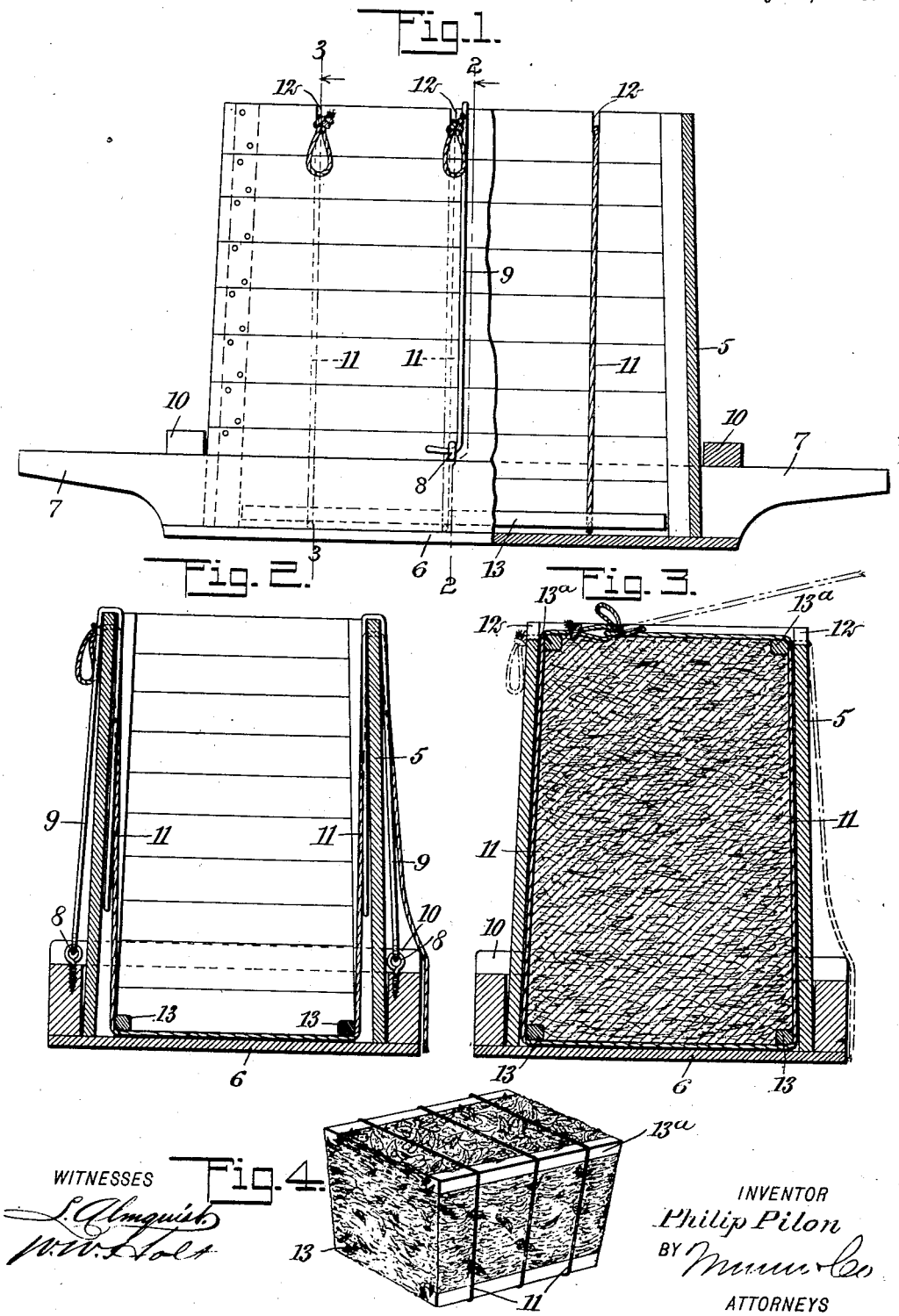

PHILIP PILON, OF SILVER BAY, NEW YORK.

BALING APPARATUS.

No. 921,453.    Specification of Letters Patent.    Patented May 11, 1909.

Application filed November 13, 1908. Serial No. 462,395.

*To all whom it may concern:*

Be it known that I, PHILIP PILON, a citizen of the United States, and a resident of Silver Bay, in the county of Warren and State of New York, have invented a new and Improved Baling Apparatus, of which the following is a full, clear, and exact description.

The invention is an improved baling apparatus, more especially designed to bale fallen tree leaves into convenient size packs to be afterward used for fertilizer and for beds for cattle, etc.

The invention may be defined as consisting of an open-ended box form in which the leaves are packed for baling, preferably tapering from bottom to top, with the enlarged end at the bottom, and a handbarrow forming the bottom of the form. In the form, preparatory to filling in the leaves, is placed one or more flexible ties, and also corner bars, the latter resting on top of the ties. The form is then filled and well trodden down, and the ends of the ties drawn taut and joined after corner bars are seated on the top.

Reference is to be had to the accompanying drawings forming a part of this specification, in which similar characters of reference indicate corresponding parts in all the views.

Figure 1 is a side elevation of my improved baling appliance, showing the same partly in vertical longitudinal section; Fig. 2 is a cross-section of the baling apparatus substantially on the line 2—2 of Fig. 1; Fig. 3 is a cross section on the line 3—3 of Fig. 1, showing the form filled and the ends of the tie joined; and Fig. 4 is a perspective view of the completed bale.

The invention more specifically described embodies in its construction a box form 5, which is of tapering form from bottom to top both longitudinally and transversely, with the enlarged end arranged at the bottom and seating when the form is in use, on a handbarrow 6, which, as is the usual practice, is provided with the conventional handles 7 at each end. Connected to the side walls of the handbarrow near the transverse center are eyes 8, in which are adapted to engage the offset ends of hooks 9, the latter being designed to engage over the top edge of the form and hold it against vertical displacement during the period the form is being filled and packed. The form is held from lateral displacement on the handbarrow by the side timbers of the latter and by crossbars 10 arranged near each end. The top edges of the box form at opposite sides are slotted, as indicated at 12, for receiving a number of flexible ties 11, generally three in number and of twine or similar material. In the form these ties are placed to lie contiguous to the inner wall thereof, as shown in Fig. 3, with one end of the tie provided with a loop, and the ends turned outwardly through the slots 12. On top of the ties in the bottom corners of the form are placed corner-bars 13, preparatory to filling the form with leaves. After the form has been filled, the leaves are trodden down to make them as compact as possible, and corner-bars 13ª placed at the top. The ties are then drawn taut and joined by passing one end of the tie through the other looped end and tying them together, as illustrated in Fig. 3. During the packing of the form, the latter is prevented from rising up on the handbarrow by the hooks 9, these hooks being disconnected when the bale has been tied, by withdrawing their offset lower ends from the screw-eyes. The form is then vertically raised from the handbarrow, leaving the finished bale seated thereon. The bale-man carries the completed bale to the point where it is to be packed or stowed, where the bale is unloaded by turning the barrow up side down and seating the bale with the large end up, leaving the bale in the best possible position for draining off rain water.

Having thus described my invention, I claim as new and desire to secure by Letters Patent:

1. In a baling apparatus, the combination of a form, a hand-barrow forming the bottom of the form, said form open at the upper end to receive the material to be baled and open at the lower end to leave the finished bale seated on the hand-barrow when the form is vertically lifted from its seat.

2. In a baling apparatus, an open-ended form for receiving and shaping the material to be baled, a detachable bottom for the form, and hooks carried by said bottom adapted to engage over the top edge of the form and lock the bottom thereto.

3. In a baling apparatus, the combination of an open-ended form for receiving and shaping the material to be baled, tapering from bottom to top, with the enlarged portion thereof at the bottom, and a bottom for the form having means for detachably applying it.

4. In a baling apparatus, an open-ended form for receiving and shaping the material to be baled, a handbarrow forming the bottom of said form, eyes attached to the opposite sides of the barrow, and hooks adapted to engage over the top edge of the form, having offset portions to engage with said eyes.

5. In a baling apparatus, an open-ended form for receiving and shaping the material to be baled, having slots in the top edge thereof at opposite side for receiving the ends of the bale ties during the period the form is being filled.

In testimony whereof I have signed my name to this specification in the presence of two subscribing witnesses.

PHILIP PILON.

Witnesses:
  ELIZABETH ELLIOTT POPE,
  ANNIE WILSON.